United States Patent
Smith (10) Patent No.: US 7,237,232 B2
(45) Date of Patent: Jun. 26, 2007

(54) METHOD AND SYSTEM FOR RECORDING PROGRAM INFORMATION IN THE EVENT OF A FAILURE

(75) Inventor: Walter R. Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 09/990,527

(22) Filed: Nov. 21, 2001

(65) Prior Publication Data

US 2004/0098640 A1    May 20, 2004

Related U.S. Application Data

(60) Provisional application No. 60/293,506, filed on May 24, 2001.

(51) Int. Cl.
*G06F 9/44* (2006.01)
*G06F 11/00* (2006.01)

(52) U.S. Cl. .................................. 717/130; 714/45

(58) Field of Classification Search ............... 717/124, 717/128, 4, 130; 714/45; 370/249
See application file for complete search history.

(56) References Cited

U.S. PATENT DOCUMENTS 5,245,615 A * 9/1993 Treu ........................... 714/45
5,608,720 A * 3/1997 Biegel et al. ............... 370/249
6,311,327 B1 * 10/2001 O'Brien et al. ............. 717/114

* cited by examiner

*Primary Examiner*—Wei Zhen
*Assistant Examiner*—Chih-Ching Chow
(74) *Attorney, Agent, or Firm*—Shook, Hardy & Bacon L.L.P.

(57) ABSTRACT

The present invention provides a method and system for use by software program developers. More specifically, the invention involves a system and method that allows software developers to more effectively diagnose bugs existing in software programs that may result in a crash of the program. Using this method, a software developer will author program code that includes LogEvent calls, which indicate events taking place that are to be logged. The developer will include in the LogEvent call a text string that is meaningful to the software developer and that indicates what the program is doing at a certain event. A generation tool inserts event tags that correspond to the text string and creates an index file mapping the text strings to the appropriate event tags. The text strings are then removed from the program code prior to retail sale, leaving the event tags in place. As the program runs, a log file is created of the events as indicated by the event tags. If the program should crash, the log file is closed and is sent to the software company. In one embodiment, the developer may include a flag that is used to remove any sensitive or personal information prior to the log file being sent to the software company. Once at the software company, the log file is processed to generate a text file by mapping the event tags with the previously removed text strings. Using this text file, the software developer can determine the events leading up to the crash of the program and can more easily develop a solution to the crash.

15 Claims, 5 Drawing Sheets

METHOD AND SYSTEM FOR RECORDING PROGRAM INFORMATION IN THE EVENT OF A FAILURE

CROSS-REFERENCE TO RELATED APPLICATIONS

This application claims the benefit of Provisional Application Ser. No. 60/293,506, filed on May 24, 2001.

STATEMENT REGARDING FEDERALLY-SPONSORED RESEARCH OR DEVELOPMENT

None.

TECHNICAL FIELD

The present invention relates to software program modules. More particularly, the invention relates to a method and system for recording and preserving specified program information in the event of a failure of the program. In addition, the invention relates to the communication of that information to other computing devices or programs for analysis of the failure.

BACKGROUND OF THE INVENTION

Despite the best efforts of software developers, software programs inevitably fail at one time or another. One type of failure is a crash. A crash occurs while a program module is running and results in the suspension of operation of the program module. Crashes are, among other things, frustrating to the users and in some cases may cause the user to lose work already performed. Software developers make every effort to "debug" the software programs before the programs are sold in the retail environment. Once in the retail environment, efforts are made to locate and fix any bugs in the software, especially those that result in a crash of the program. One problem in fixing the bug or bugs that cause the crash is the limited information that is given to the software developer. Often, the software developer will merely be informed that the program crashed. This limited information makes it difficult to ascertain the cause of the crash and to develop a solution.

In the development process for the software, developers will often add trace statements into the software code. These trace statements are used to generate a log of the program activity while the program is running. The trace log is a human-readable text file that informs the developer of the events taking place in the program. When a crash occurs in the development process, the trace log is used to diagnose the cause of the crash. This diagnostic procedure is made easier by using the trace log to determine not only what was happening at the exact moment of the crash, but also what events took place leading up to the crash. Prior to sending the program out into the retail environment, however, the trace statements are compiled out of the code. Even if not compiled out of the code, it would be inefficient to use the trace log as a method of diagnosing and fixing bugs in the retail version of the software program. Because the trace log is a human readable text file, it is very large. The size of the log therefore hinders its use as a diagnostic tool in the retail environment use because it would be time-consuming to send back to the developer.

To gather more information about a crash in the retail version, different approaches have been taken. For example, America Online has the ability to determine the location of a crash of Microsoft Corporation's "INTERNET EXPLORER" web browser and to report this information to Microsoft. However, other information regarding the state of a user's machine at the time of the crash is not known and it is difficult to distinguish between crashes having different origins. Without this information, it is difficult to determine if there is a bug, and if so, to correct the bug.

Another proposed solution is Microsoft Corporation's "DR. WATSON." This program can be used to capture primitive information about a program. This primitive information is written to a text file and stored on the user's computer. The problem is that the user must know that such a text file exists, and then must forward it to the software developer to develop a solution. In addition, the information provided is not as comprehensive as the trace log used in the development stage, so it is still difficult for the software developer to properly diagnose the problem.

Yet another proposed solution is the "WATSON" program from Microsoft Corporation. WATSON captures more information than DR. WATSON, and the information is not written to a text file. Instead, the information is captured in a mini-dump, which is in a binary format that a debugger program can open and read directly. The information collected is basically a snapshot of the program at the time of the crash. Information such as the module that was running, its version, the system configuration and the system state can be collected. WATSON then gives the user the option to convey the captured information back to the software company, in this case Microsoft Corporation. WATSON also allows other specified files to be attached to the file transferred to the software company. The problem with WATSON is that the developer will only see a snapshot of the program at the time of the crash. As a developer, the information obtained from WATSON may reveal a number of different paths the program could have taken to get to the point of the crash. Just as likely, the developer may face a situation where it cannot be determined what path the program took in getting to the crash. In other words WATSON information does not reveal the events taking place within the program leading up to the crash.

Therefore, there is a need for a method that allows a developer to author programs that contain debugging systems in a retail version of the program, which are later usable by the developer to fix a bug, without creating a large bulk of data on the user's machine. There is also a need for such a method that additionally allows sensitive user information to be filtered prior to any information being sent from the user to the developer.

SUMMARY OF THE INVENTION

The present invention provides a method and system for use by software program developers. More specifically, the invention involves a system and method that allows software developers to more effectively diagnose bugs existing in software programs that may result in a crash of the program. Using this method, a software developer will author program code that includes a call, indicating events taking place that are to be logged. The developer will include in the call a text string that is meaningful to the software developer and that indicates what the program is doing at a certain event. A generation tool inserts event tags that correspond to the text string and creates an index file mapping the text strings to the appropriate event tags. The text strings are then removed from the program code prior to retail sale, leaving the event tags in place. As the program runs, a log file is created of the events as indicated by the event tags. If the program should crash, the log file is closed and is sent to the software company. In one embodiment, the developer may include a flag that is used to remove any sensitive or personal information prior to the log file being sent to the software company. Once at the software company, the log file is processed to generate a text file by mapping the event tags with the previously removed text strings. Using this text file, the software developer can determine the events leading up to the crash of the program and can more easily develop a solution to the crash.

Additional advantages and novel features will be set forth in the description which follows and in part may become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a system and method that allows software developers to more effectively diagnose and fix bugs existing in software programs. Using this method, a software developer will indicate in the program code those events that are to be logged, along with a text string that is meaningful to the software developer as to what the program is doing at a certain event. A generation tool inserts event tags that correspond to the text string and creates an index file mapping the text strings to the appropriate event tags. The text strings are then removed from the program code prior to retail sale, leaving the event tags in place. As the program runs, a log file is created of the events as indicated by the event tags. If the program should crash, the log file is closed and is sent to the software company. Once at the software company, the log file is processed to generate a text file by mapping the event tags with the previously removed text strings. Using this text file, the software developer can determine the events leading up to the crash of the program and can more easily develop a solution to the crash.

Having briefly described an embodiment of the present invention, an exemplary operating environment for the present invention is described below.

Exemplary Operating Environment

Figure 1:
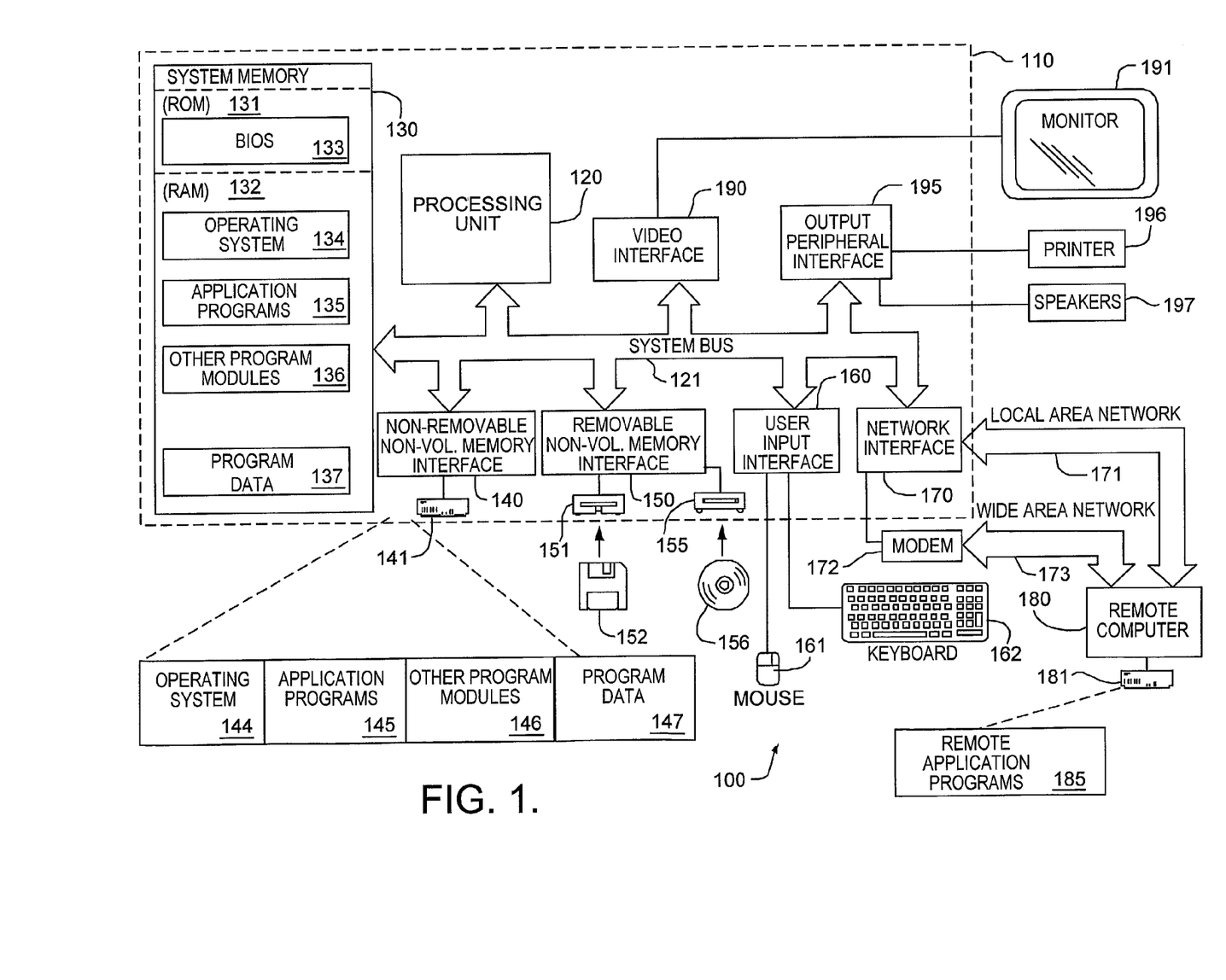
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed in computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System for Recording Program Events

Figure 2:
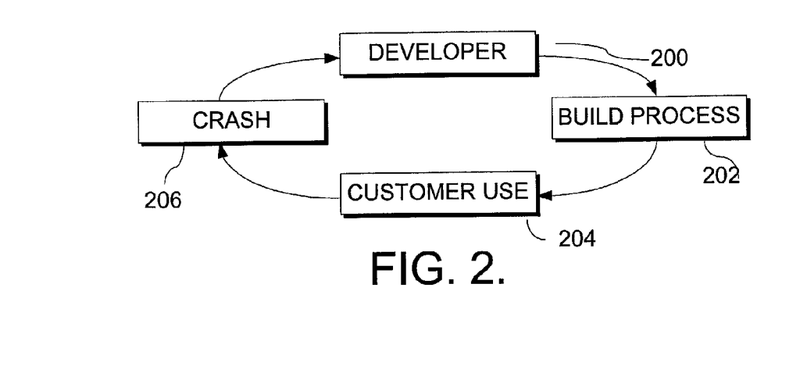
FIG. 2 is a schematic view illustrative of the software development process.

The present invention provides, among other things, a system that allows software developers to more effectively diagnose and fix bugs existing in software programs. Referring to FIG. 2, a broad view of the software development process according to the present invention is illustrated. Initially, a software developer 200 authors program code for any of a number of programs. The developer includes within the code function calls for events that are to be logged, along with a text string that is meaningful to the software developer as to what the program is doing at a certain event. During the build process 202, a generation tool inserts event tags that correspond to the text string and creates an index file mapping the text strings to the appropriate event tags. Also during the build process 202, the text strings are removed from the program code prior to retail sale, leaving the event tags in place. The program is then released for retail sale and for customer use 204. As the program runs at the customer 204, a log file is created of the events as indicated by the event tags. If the program should crash, such as at 206, the log file is closed and is sent to the software company and/or the developer 200. The developer 200 processes the log file, using a tool that generates a text file by mapping the event tags with the previously removed text strings. Using this text file, the software developer 200 can determine the events leading up to the crash of the program and can more easily develop a solution to the crash.

Figure 3:
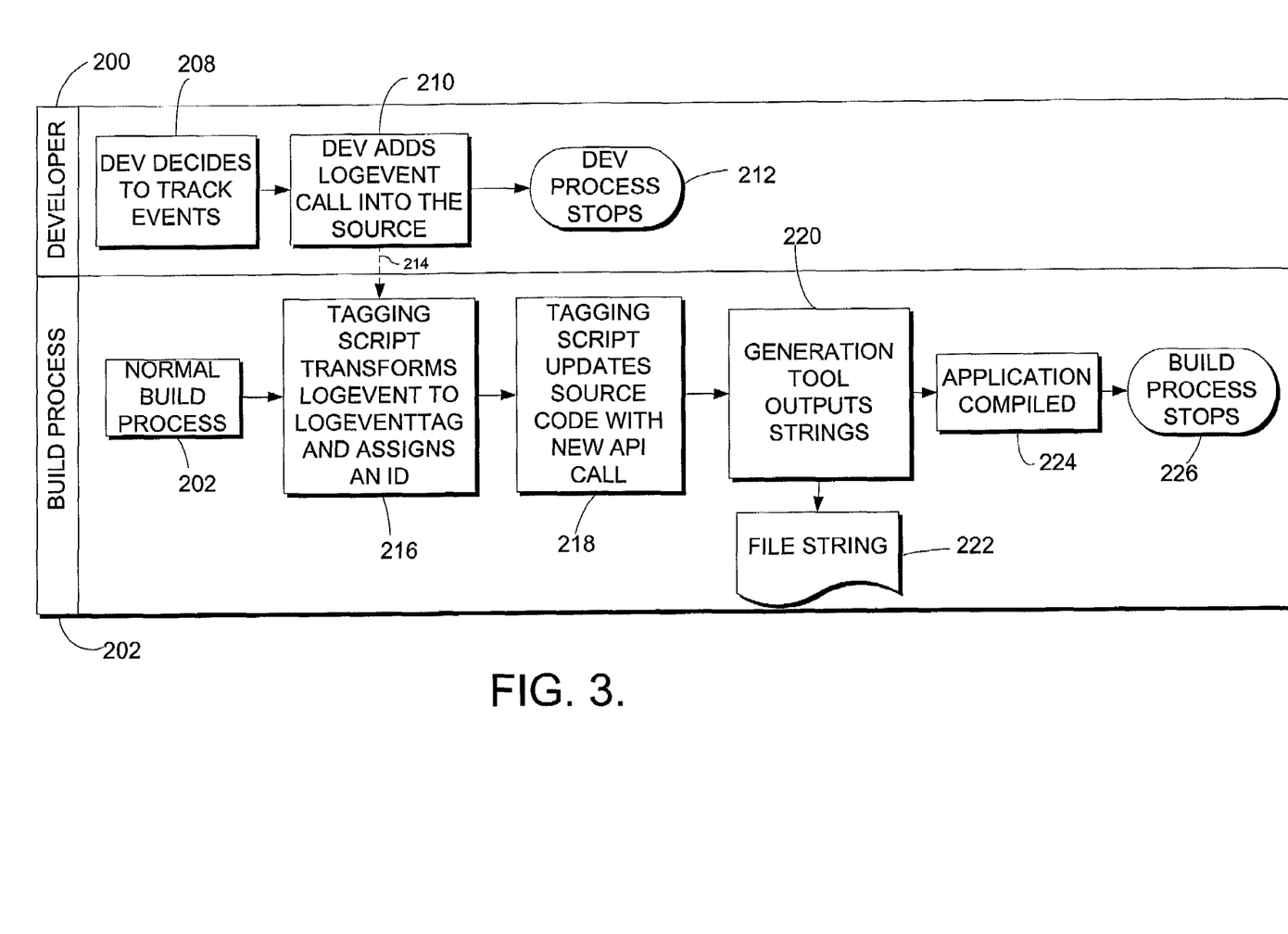
FIG. 3 is a flow chart illustrating a portion of an exemplary method for obtaining program event information leading up to a crash according to an embodiment of the present invention.

Turning now to FIG. 3, a more detailed description of the developer process 200 and the build process 202 will be provided. Initially, the developer decides that it is desirable to track certain events within the program to make it easier to diagnose any crashes that may later happen, as shown at 208. The developer adds a function call, called a LogEvent call into the program source code for each event that is desirable to trace, as shown at 210. The LogEvent call is similar to adding trace statements into the source code during a debugging stage of development. Each LogEvent call takes the general form:

LogEvent([flags], L "text string message", [arguments]).

The flags argument defaults to events that are to be recorded and placed in a log file, or LOGEVENT_LOG. Other flags could be used, such as LOGEVENT_SENSITIVE, or LOGEVENT_ERROR, the use of which is more fully described below. The text string message can be any textual message that is understandable by the developer. In other words, the text string should be such that, when read by the developer, the developer understands what events were taking place in the program at that moment. The arguments can be used to have specific data inserted into the logged event.

As a more specific example, a developer will locate an event within the program, which the developer would like to record as something that has taken place. The developer may add to the code, for example, LogEvent(LOGEVENT_LOG, L "Name lookup failed, err %1", GetLastError()). In this function call, the flag indicates that the event is one that should be recorded and placed in the log. The text string message indicates that the name lookup failed. The message strings may contain %1 to %9 to insert a human-readable form of the argument in the message. In this case, the argument will indicate what the last error was with err %1 serving as the place holder for the argument, which is the result of the GetlastError() function call. Returning to FIG. 3, after the developer has added all of the LogEvent calls desired into the code, and otherwise finishes authoring the code, the developer process ends, as indicated at 212. The next stage of development is the build process 202. The build process 202 includes the steps normally carried out by the compiler, such as checking syntax and placing the program into machine-readable form. As indicated by arrows 214, after the developer has added the LogEvent calls into the source code, the compiler in the build process 202 includes a tagging script 216. The tagging script 216 ensures that the assigned tag follows any changes later made to the text string. The tagging script 216 is a tool that transforms the LogEvent to a unique LogEventTag. In other words, the tagging script 216 assigns a unique tag to each LogEvent function call within the code. Continuing with the above example, the tagging script 216 will rewrite the example LogEvent call as LogEventTag(LOGEVENT_LOG, L "Name lookup failed, err %1", GetlastError(), TAG ('abcd')). The function name changes to signify that the call is tagged, and a tag is added at the end of the statement. The assigned tag is a unique identifier for the particular call. As shown at 218, the tagging script 216 also updates the source code with the rewritten LogEventTag call.

The build process 202 also includes a generation tool 220. Generation tool 220 scans the program code for the LogEventTag calls. Generation tool 220 creates a string file 222 containing the mapping from tag to text string for each LogEventTag call encountered. The text string is removed from the code by instructing the compiler to ignore the second argument. Each removed string is placed in string file 222, and is mapped to the unique tag assigned by tagging script 216. Each string file 222 is stored using the version number for the program to which it applies. The version number ensures that the proper string file 222 is used to reconstitute the event log, as is more fully described below. The string file 222 is essentially the decoding book, and is then stored at a known location. Continuing with the above example, the string file for the example LogEvent call will contain an entry equating "Name lookup failed, err %1" with "abcd". The compiling of the program is completed, as shown at 224 in FIG. 3, which ends the build process 202, as shown at 226. After the build process, the program code will not contain the textual string, but only the event tag. The program is then released to the retail level, where a customer will load the program onto one or more computers.

Figure 4:
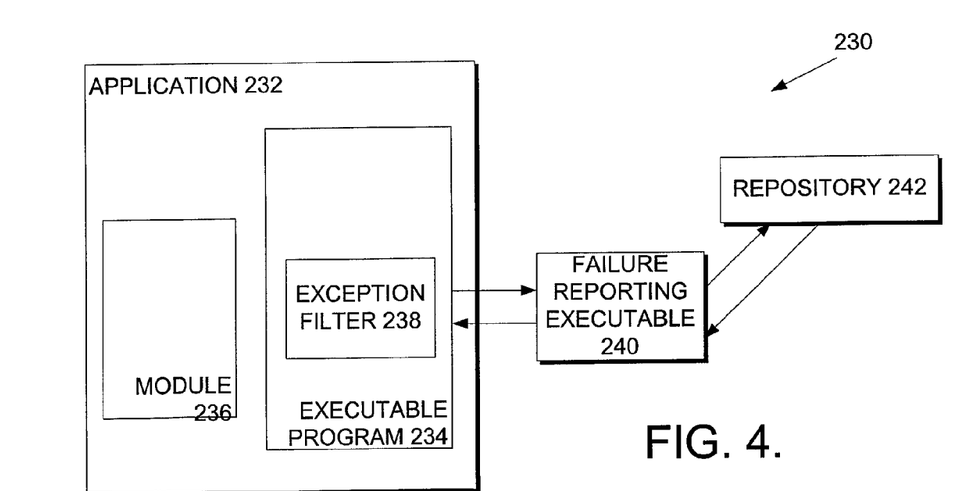
FIG. 4 is a schematic component block diagram of an example retail program.

Turning now to FIG. 4, a component block diagram of an example retail program 230 is illustrated. The program 230 typically comprises an application program module 232. The system 230 further comprises an executable program 234 inside of the application program module 232. An executable program is a program that can be run and typically means a compiled program translated into machine code in a format that can be loaded into memory and run by a computer's processor. The program 230 may also contain a module 236 that is executed by the executable program 234 inside the application program module 232. The program 230 also contains an exception filter 238. Exception filters are well-known in the art and may be registered by program modules when the program is started. When a failure or crash occurs, the exception filter code is executed. For example, suppose a failure occurs while executable program 234 is executing instructions running module 236. If executable program 234 has registered exception filter 238 with the operating system, then the exception filter 238 is executed when executable program 234 encounters a failure.

The computer also contains a failure reporting executable 240. The failure reporting executable 240 is an executable program comprising all of the instructions needed to communicate between the program 230 and a repository 242. The repository 242 is typically a remote server operated by the manufacturer or marketer of the program 232. The communication of a failure to the repository 242 is discussed more fully below. A suitable failure communication system is the "WATSON" program from Microsoft Corporation of Redmond, Wash.

Figure 5:
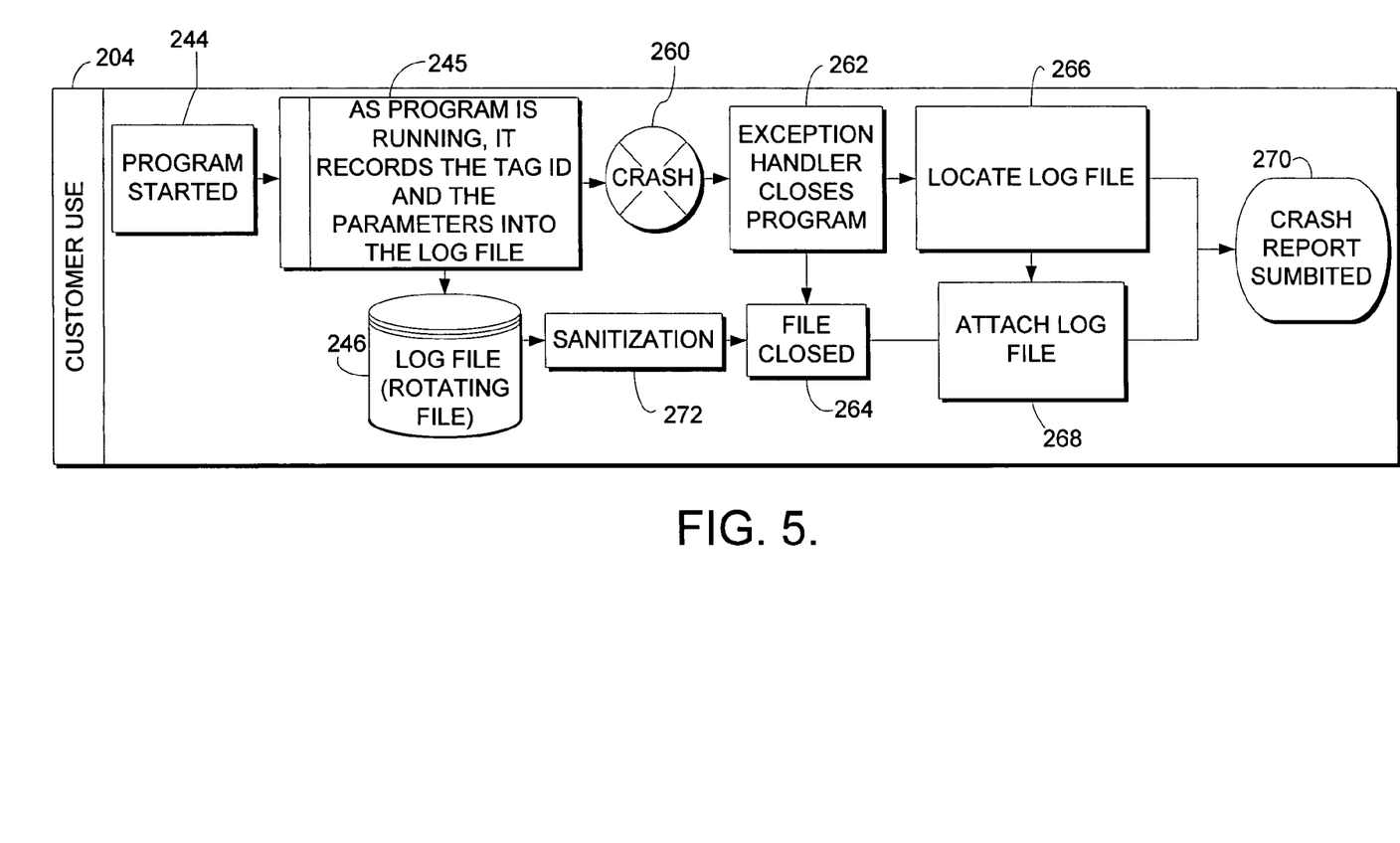
FIG. 5 is a flow chart illustrating a portion of an exemplary method for obtaining program event information leading up to a crash according to an embodiment of the present invention.

Turning now to FIG. 5, the customer will, at some point, start the program 230, as indicated at 244. As the program 230 runs, a log file 246 is created, as indicated at 245 in FIG. 5. Log file 246 is a ring buffer that records the log events in a loop. The log file has a predetermined size, such as 64 Kb, of memory. The beginning of the log file 246 contains the version number of the program 230 for later reference. As events are encountered that have LogEvent calls written into the code, the events are logged into the log file 246. The textual strings will not be present in the events logged, because they are removed during the build process by the generation tool 220 and placed in string file 222. Instead, for each line of code with a LogEvent call, the time stamp, a thread ID, and the unique tag are written into the log, along with any data corresponding to the arguments. Continuing with the above example, the log entry into log file 246 would be "timestamp, threadID, abcd, 123", where "abcd" is the unique tag assigned by tagging script 216 and 123 is the result of the argument for GetLastError. This is a much more compact statement in the log file 246 than would be the case if the textual message was still included.

Figure 6:
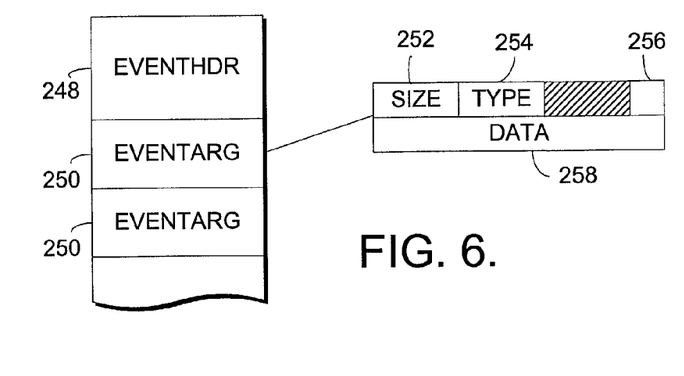
FIG. 6 is a schematic view of the structure of recorded events according to the present invention.

The basic structure for each event within log file 246 is illustrated in FIG. 6. As shown in FIG. 6, each event will have an event header, EVENTHDR, labeled 248. If there are no arguments present in the LogEvent call, then only the header 248 is present. If arguments are present in the LogEvent call, then a corresponding number of event argument fields, EVENTARG, will also be present, labeled 250. The header 248 contains the timestamp, the threadID, any flags and the unique tag. The event argument 250 contains fields for the size 252, the type 254 and a last argument field 256 that can be set to indicate the argument is the last argument for the event. In addition, a data field 258 is provided.

Returning to FIG. 5, if the program 230 now crashes, as indicated by 260, the exception filter 238 will execute and close the program 230, as shown at 262. The log file 246 is also closed if there is a crash, as shown at 264. The failure reporting executable 240 is then executed to report the crash to the repository 242. Failure reporting executable 240 is given instructions to locate and attach the log file 246, as shown at 266 and 268, respectively. Therefore, log file 246 will be sent to the repository 242, along with any other information gathered by failure reporting executable 240, as shown at 270. The crash data is sent to the repository 242 as cab files, or in some other known compressed format cab is used as a file extension for cabinet files. Cabinet files are multiple files compressed into one, and later extractable with an extract.exe utility. It should be understood that while it has been described as using failure reporting module 240 to locate and attach the log file 246 and send it to the repository 242, any other of a number of ways to send the log file to the developer could be used and are within the scope of this invention. If the program closes normally, without crashing, the log file 246 is simply deleted.

As shown in FIG. 5 at 272, prior to closing the log file, a sanitizing process may occur. In very general terms, the sanitizing process is used to eliminate any personal information of the computer user that has been logged. It is for this reason that one of the flags provided is a LOGEVENT_SENSITIVE flag. If the software developer, when authoring the code, includes a LogEvent call that could potentially put sensitive or personal information into the log file 246, the developer also includes the "sensitive" flag. Before closing the log file 246 and sending it to the repository 242, all events for which a sensitive flag is present are removed. That is, the arguments are removed, but the underlying generic event remains. For example, the event may indicate that a login was attempted, but the sensitive data, such as the user name and password, is removed. In this way, the log file is filtered to remove any sensitive data prior to sending the log file to the repository 242. The reason the data is written to the log file in the first place, and then removed is that it is possible to look at the data by examining the log while the program is running, such as for debugging purposes.

Figure 7:
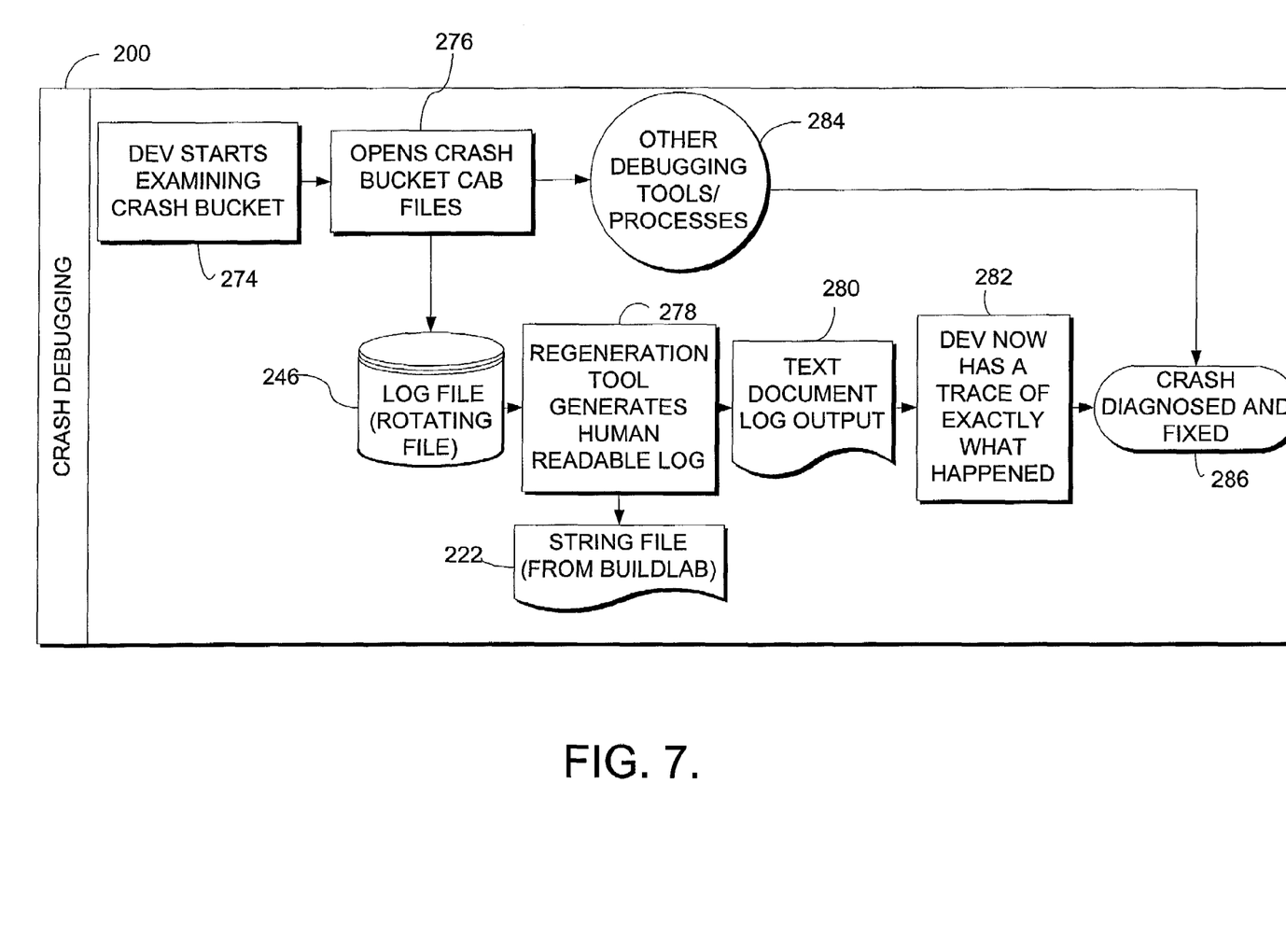
FIG. 7 is a flow chart illustrating a portion of an exemplary method for obtaining program event information leading up to a crash according to an embodiment of the present invention.

Turning now to FIG. 7, the process of analyzing the data from the log file 246 is illustrated. The process begins at 274 with the developer obtaining the crash information from the repository 242. The developer the opens the .cab files containing the crash information at 276. The log file 246 is processed separately from any other crash data the .cab files may contain. Therefore, the log file 246 is shown separately in FIG. 7. A regeneration tool 278 combines the log file 246 with the string file 222 that was separated during the build process. Regeneration tool 278 locates the string file 222, by version number, that matches the version number of the program generating the log file 246, and maps the tag of each event to its corresponding string. In other words, regeneration tool 278 takes the compact event from log file 246 and makes it more meaningful by regenerating the textual string previously removed. This process is essentially a decoding process, where the tags are converted back into meaningful text. Continuing with the example above, the regeneration tool displays the event as "Name lookup failed, 123." The combined result of the regeneration tool 278 is a text document output, shown as 280. By examining this text document, the developer can determine the events that were taking place prior to the crash, as shown at 282. The developer can use the output 280, along with other debugging tools and processes 284 to diagnose the crash and develop a solution 286.

The invention can be seen to provide software developers with valuable information regarding a crash of a software program. More specifically, the invention provides information in a text document that is human readable about specific events that happened leading up to the crash. The events are those that are specified as events that are to be traced, and the text messages are meaningful to the software developers, because the text messages are developer created. Moreover, the text messages are removed from the program prior to being released for retail sale. In this way, a log file is created that is small enough to easily transfer from a customer's machine to a known repository. Moreover, by removing the text messages, internal details of the code are not revealed outside of the software company. The invention provides a regeneration tool that will regenerate the textual strings, making the log file meaningful again to the software developer. By providing information about events happening within the program prior to a crash, the software developer will be able to more effectively develop a solution to the crash.

Alternative embodiments of the present invention become apparent to those skilled in the art to which it pertains upon review of the specification, including the drawing figures. The various computer systems and components shown in FIGS. 1-7 and described in the specification are merely exemplary of those suitable for use in connection with the present invention. Accordingly, the scope of the present invention is defined by the appended claims rather than the foregoing description.

The invention claimed is:

1. A method for obtaining information regarding events to be taking place within a software program to be used by a customer on a computing device, comprising:
   including, for each of a number of selected events, an indicator within the software program that records the selected event, the indicator including a text string created by a software developer and descriptive of the selected event;
   assigning and including within the software program a unique tag corresponding to each text string;
   creating an index mapping each tag to the corresponding text string;
   prior to retail sale, removing each text string from the software program;
   releasing the software program, which includes the unique tags, for retail sale;
   after releasing the software program for retail sale, receiving a file of events as indicated by at least a portion of the unique tags included in the software program, the file being created when the software program is run on the computing device used by the customer;
   processing the file by using the index to map each unique tag in the file with its corresponding text string to generate a text string record of the events which took place within the software program; and
   outputting the text string record of the events which took place within the software program.

2. The method of claim 1, further comprising:
   using the text sting record of the events which took place within the software program to determine how the software program may have failed.

3. The method of claim 1, wherein the indicator is a function call.

4. The method of claim 1, wherein as the software program executes on the computing device used by the customer, the size of the file of the recorded events is limited.

5. The method of claim 4, wherein in response to a failure of the software program on the computing device used by the customer, the file is automatically transferred to a repository accessible by the software provider.

6. The method of claim 5, wherein the failure is a crash of the software program.

7. The method of claim 1, further comprising including within selected indicators an identifier, the identifier identifying information unwanted by a software provider.

8. The method of claim 7, wherein prior to receiving the file, selected data indicated by the identifier is filtered out as unwanted information.

9. A computer storage media having computer-executable instructions for performing a method for obtaining information regarding events to be taking place within a software program to be used by a customer on a computing device, comprising:
   searching for a text string within the software program created by a software developer and descriptive of a selected event;
   assigning and including within the software program a unique tag corresponding to each text string found; and
   creating an index mapping each tag to the corresponding text string;
   prior to retail sale, removing each text string from the software program;
   releasing the software program, which includes the unique tags, for retail sale;

after releasing the software program for retail sale, receiving a file of events as indicated by at least a portion of the unique tags included in the software program, the file being created when the software program is run on the computing device used by the customer;

processing the file by using the index to map each unique tag in the file with its corresponding text string to generate a text string record of the events which took place within the software program; and outputting the text string record of the events which took place within the software program.

10. A computer system having a processor, a memory, and an operating environment, the computer system operable to execute a method for obtaining information regarding events to be taking place within a software program to be used by a customer on a computing device, comprising:

searching for a text string within the software program created by a software developer and descriptive of a selected event;

assigning and including within the software program a unique tag corresponding to each text string found;

creating an index mapping each tag to the corresponding text string;

prior to retail sale, removing each text string from the software program;

releasing the software program, which includes the unique tags, for retail sale;

after releasing the software program for retail sale, receiving a file of events as indicated by at least a portion of the unique tags included in the software program, the file being created when the software program is run on the computing device used by the customer;

processing the file by using the index to map each unique tag in the file with its corresponding text string to generate a text string record of the events which took place within the software program; and outputting the text string record of the events which took place within the software program.

11. A method for recording program information, by a software provider, about events to be taking place within a software program executing on a computer to be used by a customer, comprising:

including, for each of a number of selected events, an indicator within the software program that records the selected event, the indicator including a text string created by a software developer and descriptive of the selected event;

coding the text string with a unique tag corresponding to each text string; creating a decoding file mapping each unique tag to the corresponding text string; and prior to retail sale, removing each text string from the software program;

releasing the software program, which includes the unique tags, for retail sale;

after releasing the software program for retail sale, receiving a file of events as indicated by at least a portion of the unique tags included in the software program, the file being created when the software program is run on the computer used by the customer;

processing the file by using the decoding file to map each unique tag in the file with its corresponding text string to generate a text string record of the evens which took place within the software program; and outputting the text string record of the events which took place within the software program.

12. The method of claim 11, further comprising using the text string record of the events which took place within the software program to determine how the software program may have failed.

13. The method of claim 2, wherein the file is deleted on the computer used by the customer when the program closes normally, without crashing.

14. The method of claim 7, wherein the unwanted information is sensitive or personal information about the customer.

15. The method of claim 11, wherein removing each text string from the software program prior to releasing the software program for retail sale includes deleting each text string from the software program but at least temporarily storing said each text string incident to said deleting.

* * * * *